(12) United States Patent
Ramachandran et al.

(10) Patent No.: US 7,761,827 B1
(45) Date of Patent: *Jul. 20, 2010

(54) INTEGRATED CIRCUIT DESIGN SYSTEM, METHOD, AND COMPUTER PROGRAM PRODUCT THAT TAKES INTO ACCOUNT OBSERVABILITY BASED CLOCK GATING CONDITIONS

(75) Inventors: Venky Ramachandran, Cupertino, CA (US); Nikhil Tripathi, Noida (IN); Anmol Mathur, San Jose, CA (US); Sumit Roy, San Jose, CA (US); Malay Haldar, Noida (IN)

(73) Assignee: Calypto Design Systems, Inc., Santa Clara, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 11/832,425

(22) Filed: Aug. 1, 2007

(51) Int. Cl.
*G06F 17/50* (2006.01)
*G06F 9/45* (2006.01)
(52) U.S. Cl. .................. 716/6; 716/1; 716/5; 716/18
(58) Field of Classification Search .................. 716/1, 716/5–6, 18
See application file for complete search history.

(56) References Cited

U.S. PATENT DOCUMENTS 6,247,134 B1 * 6/2001 Sproch et al. ............... 713/320

OTHER PUBLICATIONS

Benini et al., Symbolic Synthesis of Clocking-Gating Logic for Power Optimization of Synchronous, ACM, 1999, pp. 351-375.*
U.S. Appl. No. 11/832,443, filed Aug. 1, 2007.

* cited by examiner

*Primary Examiner*—Nghia M Doan
(74) *Attorney, Agent, or Firm*—Zilka-Kotab, PC

(57) ABSTRACT

An integrated circuit design system, method, and computer program product are provided that takes into account observability based clock gating conditions. In use, at least one condition is identified where an output of a first logic element is not a function of a first input of the first logic element, due to a second input of the first logic element. To this end, at least one second logic element may be disabled based on the identified condition for power savings or other purposes.

18 Claims, 4 Drawing Sheets

INTEGRATED CIRCUIT DESIGN SYSTEM, METHOD, AND COMPUTER PROGRAM PRODUCT THAT TAKES INTO ACCOUNT OBSERVABILITY BASED CLOCK GATING CONDITIONS

FIELD OF THE INVENTION

The present invention relates to systems for designing integrated circuits, and more particularly to optimizing integrated circuit design.

BACKGROUND

One objective when designing integrated circuits involves the reduction of necessary power consumption by the resultant design. During use, various logic elements such as flip flops, etc. require power each time they are switched at each clock cycle. There is thus a desire to disable such logic when, of course, it does not impact the desired functionality of the integrated circuit design.

However, such task of determining when different logic can be disabled can be problematic. For example, additional logic is often required to determine the conditions in which such disabling is appropriate. In some cases, power consumption of such additional logic can negate any power savings on the original integrated circuit design.

There is thus a need for addressing these and/or other issues associated with the prior art.

SUMMARY

An integrated circuit design system, method, and computer program product are provided that takes into account observability based clock gating conditions. In use, at least one condition is identified where an output of a first logic element, "L", is not a function of a first input of the first logic element, due to a second input of the first logic element. To this end, at least one second logic element (e.g. in the transitive fanin of the logic element "L") may be disabled based on the identified condition for power savings or other purposes.

DETAILED DESCRIPTION

Figure 1:
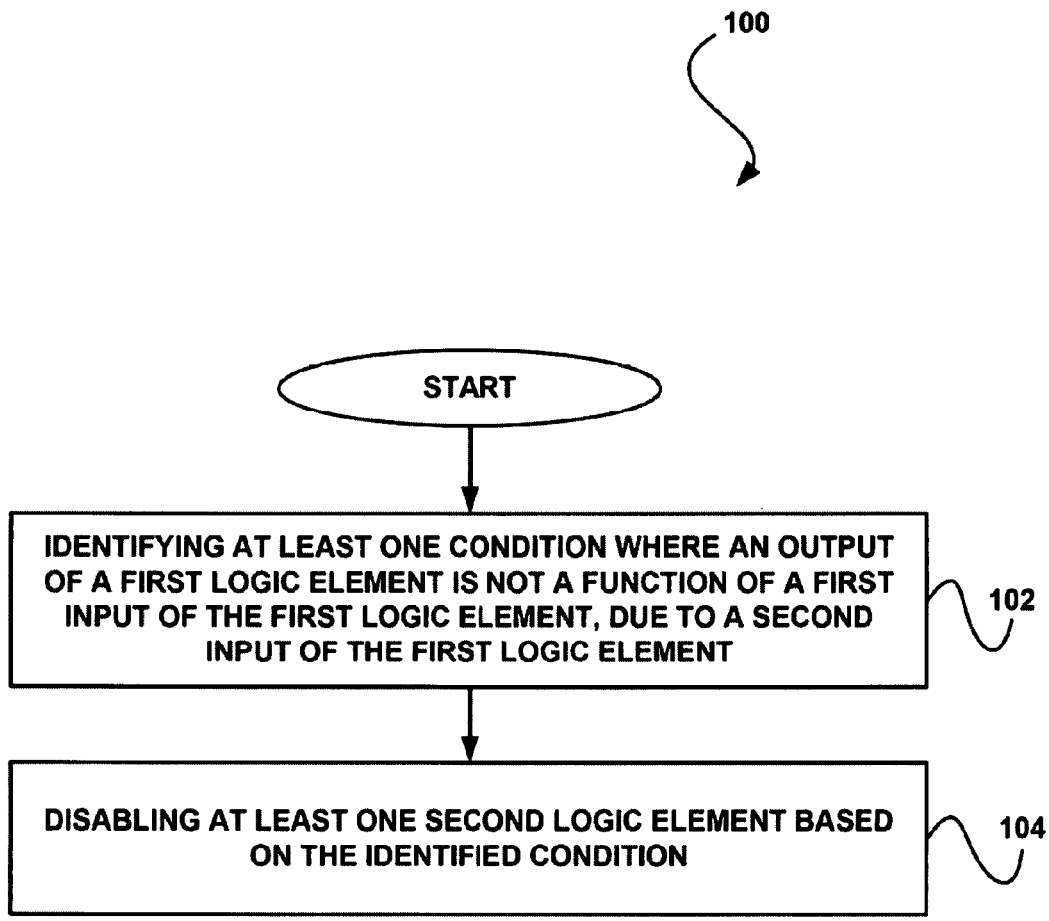
FIG. 1 shows a method for designing integrated circuits by taking into account observability based clock gating conditions, in accordance with one embodiment.

FIG. 1 shows a method 100 for designing integrated circuits by taking into account observability based clock gating conditions, in accordance with one embodiment. As shown in operation 102, at least one condition is identified where an output of a first logic element, "L", is not a function of a first input of the first logic element, due to one or more second inputs of the first logic element. In one embodiment, such condition(s) may be identified as a potential opportunity to disable at least one second logic element, while not affecting the functionality of the resultant integrated circuit design.

In the context of the present description, the foregoing first logic element L may refer to any element of logic with at least two inputs and an output. Just by way of example, in various embodiments, the logic element may refer to a flip flop, a multiplexer (MUX), an AND gate, an OR gate, etc. Further, in an embodiment where the first logic element includes a flip-flop, such flip flop may include an enable pin, which when asserted, results in the flip-flop holding a previously stored value. As mentioned earlier, such logic element may operate such that it is capable of a condition where an output of the first logic element is not a function of a first input of the first logic element, due to a second input of the first logic element. Table #1, for example, illustrates operation of an AND gate.

TABLE #1

| INPUT A | 0 | 1 | 0 | 1 |
| INPUT B | 0 | 0 | 1 | 1 |
| OUTPUT | 0 | 0 | 0 | 1 |

As shown, the first input (INPUT A) does not affect the output when the second input (INPUT B) is "0." Again, such condition may be identified as a potential opportunity to disable at least one other second logic element, while not affecting the functionality of the resultant integrated circuit design. In one embodiment, such condition may include an observability based clock gating condition (ODC). Of course, the foregoing example is set forth for illustrative purposes only and should not be construed as limiting in any manner whatsoever.

To this end, at least one second logic element may be disabled based on the identified condition for power savings or other purposes. See operation 104. In one embodiment, the second logic element may include a logic element that is included within a transitive fanin of the first logic element. Such transitive fanin may include logic elements whose output is capable of influencing an input of the first logic element. To this end, a second logic element whose output is capable of influencing an input of the first logic element may be disabled based on the identified condition.

Further, in the context of the present description, such disabling may include any design consideration, operation, and/or anything else that results in the second logic element requiring less power during use of the associated integrated circuit. For example, in one embodiment, such disabling may include simply refraining from clocking the second logic element when the condition indicates that the power savings is available, while not affecting the functionality of the resultant integrated circuit.

In still an additional embodiment, the aforementioned condition may take into account the inputs during more than one clock cycle. For example, the condition may be one where the output of the first logic element (that initiates the condition) is not a function of the first input of such logic element during a first clock cycle and a number of subsequent cycles, due to a second input of the logic element during the first clock cycle and the same number of subsequent clock cycles. In such a case, the second logic element may be disabled during the first clock cycle and/or cycles previous to the first clock cycle.

In another embodiment, the output of the first logic element may be a function of the first input of the first logic element if the second input of the first logic element is in a first state (e.g. "1"). Further, the output of the logic element may not be a function of the first input of the logic element if the second input of the logic element is in a second state (e.g. "0"). For example, such operation may reflect that of a flip flop or register.

In such embodiment, the second logic element (e.g. elements in the transitive fanin of the first logic element) may be disabled during a first clock cycle when the second input of the first logic element is in the second state during any subsequent clock cycles.

Such technique of identifying such conditions and predicting an output over multiple clock cycles may be referred to as acceleration. An example of acceleration will now be set forth. In one exemplary embodiment, input A may drive a flip flop FA, whereas input B may drive flip flop FB. In addition, flip flop FA and flip flop FB may optionally be always enabled, such that input to a respective one of such flip flops during a first clock cycle is the output of the same flip flop during the subsequent clock cycle.

Further, the final output associated with such example of acceleration may be the output of flip flop FA added to the output of flip flop FB (i.e. FA+FB). In this way, flip flop FA and flip flop FB may be utilized as an adder. For example, at clock cycle 0, input A may be "1" and input B may be "2." In such a situation, the final output may be insignificant since the final output depends on the output of flip flop FA and flip flop FB, which do not necessarily depend on input A or input B.

During the subsequent clock cycle (i.e. clock cycle 1), input A may be "2," input B may be "3," the output of FA may be "1," and the output of flip flop FB may be "2." To this end, the final output may be "3," since the sum of the output of FA and the output of flip flop FB is equal to "3." During clock cycle 2, input A may be "3," input B may be "1," the output of flip flop FA may be "2," and the value of flip flop FB may be "3." Accordingly, the final output may be equal to "5," since the sum of the output of flip flop FA and the output of flip flop FB is equal to "5."

In this way, by identifying input A and input B during a first clock cycle, the final output may be predicted for the subsequent clock cycle. In particular, the sum of the input for a first logic element and a second logic element, with respect to a first clock cycle, may include an accurate prediction for the output with respect to the subsequent clock cycle. Thus, acceleration may be utilized to determine whether output of a flip flop logical element associated with a next clock cycle is observable during a previous clock cycle. Accordingly, an observability based clock gating condition may be accelerated by one clock cycle, as an option.

In another exemplary embodiment, a multiplexer may be created utilizing flip flop FA and flip flop FB. For example, the final output may optionally be determined by FB==3. Thus, if the output of flip flop FA is "0," such that the output of flip flop FB is "3," then the output of flip flop FA may be passed to the final output. If, however, the output of flip flop FB is not "3," then the final output may be equal to "0." Table #2 illustrates examples of final output for a series of clock cycles.

TABLE #2

Clock Cycle 0: A = 1, B = 2, final output = insignificant
Clock Cycle 1: A = 2, B = 3, FA = 1, FB = 2, final output = 0
Clock Cycle 2: A = 3, B = 1, FA = 2, FB = 3, final output = 2

As shown in Table #2, the final output may only be observable for the second subsequent clock cycle (i.e. Clock Cycle 2). Accordingly, a write operation to flip flop FA during the first clock cycle (i.e. Clock Cycle 0) may be disabled, since the output of flip flop FA is not necessarily utilized during a subsequent clock cycle (i.e. Clock cycle 1). Moreover, the observability condition required to disable flip flop FA may be the acceleration of FB!=3 (i.e. FB is not equal to 3), which evaluates to a predicted result B!=3 (i.e. B is not equal to 3).

Thus, an unaccelerated version of flip flop FB!=3 may evaluate to 1 in a subsequent clock cycle, such that a write operation to FA in the first subsequent clock cycle (i.e. Clock Cycle 1) may be disabled. As a result, the final output may evaluate to "1" during the second subsequent clock cycle (i.e. Clock Cycle 2) due to flip flop FA retaining a value with respect to first subsequent clock cycle (i.e. Clock Cycle 1). Such unaccelerated final output may not necessarily be correct. Of course, the foregoing example is set forth for illustrative purposes only and should not be construed as limiting in any manner whatsoever.

More illustrative information will now be set forth regarding various optional architectures and uses in which the foregoing method may or may not be implemented, per the desires of the user. For example, the conditions may be propagated from a plurality of outputs to a plurality of inputs. As an option, such conditions may be propagated from the outputs to the inputs utilizing a depth first search algorithm. In various embodiments, iterative propagation of the conditions may thus ensure that, for an acyclic netlist, the conditions for all nets that are in the transitive fanout of a particular net are evaluated before the condition for the particular net is evaluated. Such fanout of the particular net may include the various inputs driven by the output associated with such net.

Still yet, the first logic element, "L", may be disabled during a first clock cycle when one of the inputs of a logic element in the transitive fanout of "L", is in the second state (e.g. "0") during a subsequent clock cycle.

These and other features will now be described in more detail. It should be strongly noted, however, that the following information is set forth for illustrative purposes and should not be construed as limiting in any manner. Any of the following features may be optionally incorporated with or without the exclusion of other features described.

In one embodiment, locations in a logical design may be identified where conditional assignments are identified as initiation points for observability based conditions. For example, combinational nodes within a netlist that steer data, such as MUXes and AND gates, may be initiation points for observability based conditions. An input to such a node may not be observable at the output under the condition that it is not allowed to pass through, as determined by the select in the case of a MUX and the other input in the case of an AND gate, as described in more detail below.

In addition to these combinational nodes, all gated flip flops may also be initiation points for observability based conditions, since associated inputs (e.g. to the d-pin) may not be observed under the gating condition of the flip flop. Such conditions may be used to gate flip flops (or strengthen existing gating conditions) that are within the transitive fanin of the initiation points, if they can be successfully propagated to the input side of candidate flip flops.

In the context of the present description, the netlist may include connectivity information associated with an electronic design. Further, the nodes may include nets that are representative of the connections of the electronic design. Still yet, the fanin of a particular node may include the various inputs of such node.

Figure 2:
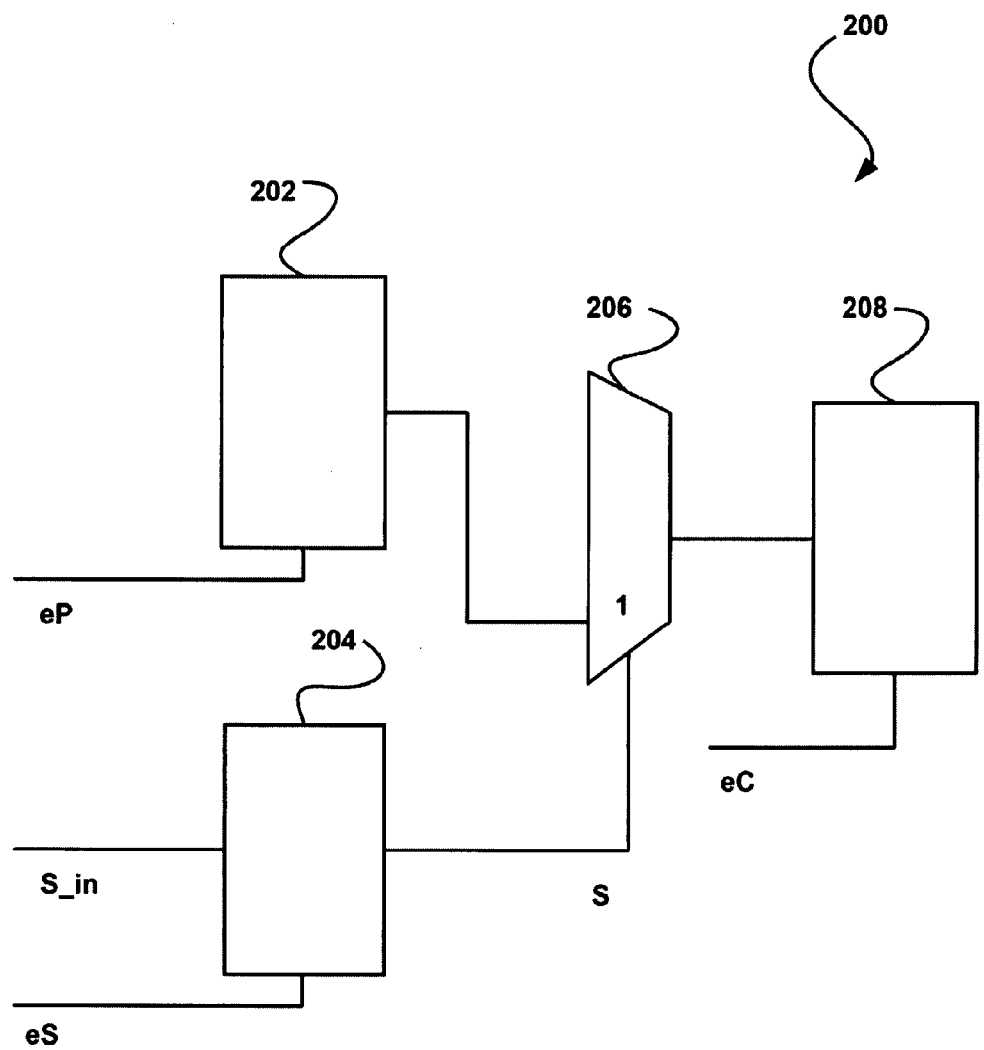
FIG. 2 shows a system capable of a condition where an output of a logic element is not a function of a first input of the logic element, due to a second input of the logic element, in accordance with yet another embodiment.

FIG. 2 shows a system 200 capable of a condition where an output of a logic element is not a function of a first input of the logic element, due to a second input of the logic element, in accordance with yet another embodiment. As an option, the system 200 may be implemented in the context of the details of FIG. 1. Of course, however, the system 200 may be implemented in any desired environment. Further, the aforementioned definitions may equally apply to the description below.

It should be noted, in the context of the present description, the code mentioned herein includes code written in Verilog®. Of course, in other embodiments, the code may optionally be written utilizing any desired coding language.

As shown, the output of a producer flip flop 202 and a selector flip flop 204 are utilized to provide input to a multiplexer 206, the output of which, in turn, provides input to a third flip flop 208. In one embodiment, a value to be written into the producer 202 at time T may not necessarily be observable if: $S(t)*eC(t)==0$, for all t such that for $T \leq t \leq T1$ $eP(t)==0$ and $eP(T1)==eP(T)=1$.

Thus, a current value of the producer 202 may not necessarily be observable if a current value is overwritten before the producer 202 is sampled for the value. In one embodiment, such non-observability may be referred to as a safety property. For example, the safety property may indicate conditions under which it is functionally safe to propagate a condition based on clock gating conditions across a flip flop, including where such flip flop is enabled.

In one embodiment, given arbitrary eP (input to the producer 202), eC (input to the third flip flop 208), and eS (input to the selector 204), it may not be possible to determine the safety of the condition. Thus, finding conditions may involve identifying conditions in which the safety property can be verified and the signals involved accelerated by the appropriate number of clock cycles.

In use, conditions may be propagated across flip flops. In one embodiment, a condition may be propagated based on a clock gating condition from the output of a flip flop to its input in a functionally safe manner. For example, if eS=>eP |~S_in (e.g. where eS implies that (eP or S_in is 0)), then it may be guaranteed that whenever a select of the multiplexer 206 changes, either the producer 202 is written, or the producer 202 becomes unobservable at the third flip flop 208. As a result, a write to the producer 202 may optionally be safely gated by the select condition (~S) accelerated by 1 clock cycle.

In the present embodiment, if the accelerated select is 0 at the time of the current write to the producer 202, the current write to the producer 202 may not be capable of being observed at the third flip flop 208 in the next cycle. Additionally, if the selector 204 is written at some clock cycle after a current clock cycle, the producer 202 may be overwritten, or may otherwise stay unobservable at the third flip flop 208. In the context of the present embodiment, overwriting may render a current write unobservable at the third flip flop 208.

In other words, a write to the producer 202 may not be observable at the third flip flop 208 unless the selector 204 is also written at the same time as the producer 202.

The gating function due to the selector 204 in such a situation may be as follows: $acc((\text{---}S,1))=eS.\sim S\_in | \sim eS.\sim S$, where acc(signal, N) represents the N clock accelerated version of a signal (or a function of signals). If the eS is 1, then the next cycle version of the select may be S_in, while the next cycle version of the select may be the selector 204 itself if the selector 204 is not being written. As an option, the safe condition for the propagation of conditions across a flop may be referred to as relaxed implication.

It should also be noted that special circumstances may also allow for the safe condition to be achieved. In one embodiment, where eS=>eP (i.e. eS implies eP), such condition may be stronger than a relaxed implication, and may therefore satisfy the safety property, as mentioned above. In another embodiment, where eS==eP (i.e. eS implies eP and eP implies eS), such condition may be stronger than the condition where eS=>eP, and may thus satisfy the safety condition, as mentioned above. In addition, where eS==eP, the accelerated expression may simplify to: $acc((\sim S, 1))=S\_in$, since eS may always be "1" when eP is "1". In yet another embodiment, where eP==1 (e.g. the producer 202 is always enabled), the relaxed implication may optionally always hold, since the implication from anything to "1" may be true.

Still yet, the foregoing propagation may apply in cases involving multiple inputs, as shown in Table #3.

TABLE #3

| Assume S = F(S1, S2, . . . Sk); |
| If eP = eS1 = eS2 = . . . = eSk then |
| gating function is |
| !acc(S, 1) = !F(acc(S1, 1), acc(S2, 1), . . . acc(Sk, 1)) |

In the context of Table #3, the function acc( ) may represent the accelerator function described above with respect to FIG. 1. In addition, acc(S, 1) may indicate that the selector 202 is accelerated by one clock cycle. Just by way of example, the distributed law of acceleration function may be represented such that, for an expression of a condition f(X1, X2, . . . , Xn), where Xi are signals driven by flops, then acc(f(X1, X2, . . . Xn), 1)=f(acc(X1, 1), acc(X2,1) . . . , acc(Xn, 1)).

The distributive law of acceleration trivially holds for a single term (acc(f(X1), 1)=f(acc(X, 1)). For multiple terms, the proof may be established by induction. Assuming that the law is true for all functions of n variables, a function of n+1 variables may be decomposed into an associated Shannon's expansion (e.g. where a Boolean logic function (F) may be expanded in terms of a Boolean variable (X)), on which the distributive law holds. For the acceleration functions under relaxed implication, see Table #4.

TABLE #4

| Further acc(Xi, 1) = { X_in if eX == eP, |
| en?X_in: X if eX => eP | acc( f( X1, X2, . . . , Xi, . . . ,Xn), 1) }. |

In another embodiment, the conditions may be iteratively propagated from the outputs to the inputs. For example, as mentioned above with respect FIG. 1, the conditions may be propagated from the outputs to the inputs utilizing a depth first search algorithm. In addition, the depth first search algorithm may be utilized to ensure that, for an acyclic netlist, conditions for nets that are in a transitive fanout of a particular net are evaluated before the condition for the particular net, and thus the fanin thereof, is evaluated. The nets may optionally be evaluated in post-order within the depth first search to enforce the foregoing situation.

In the context of the present description, the netlist may include connectivity information associated with a logical design. For example, such connectivity information may include connectivity between various nodes (e.g. logical elements). In addition, such netlists may include a hierarchy (e.g. tree) of connectivity information, for example, that is acyclic. Further, the nets may optionally include any of the connections between the nodes of the electronic design.

Still yet, the fanout of the particular net may include the various inputs driven by the output associated with such net. Still yet, the fanin of a particular net may include the various inputs of such net. Thus, the depth first search algorithm may include any algorithm capable of traversing the netlist by way of the depth of the netlist prior to the breadth of the netlist.

The iterative propagation of the conditions from the outputs to the inputs may include a variety of features. In one embodiment, the conditions (e.g. of the primary outputs) may be initialized to null. In another embodiment, with respect to a point in which a condition is initiated, the condition of output of a node may be ORed with a condition under which a specific input of the node is unobservable, in order to produce the condition of the specific input.

In yet another embodiment, for nodes that are not condition initiation points, the conditions of the output may be passed to the inputs in an unmodified format. In still yet another embodiment, with respect to fanout stems identified during the iterative process, the condition of the driver of the stem may be computed as the intersection (logical AND) of the conditions of the individual fanouts. Furthermore, with respect to a flop, the condition of the output of the flop may be accelerated (as described above with respect to FIG. 1), in order to produce the condition of the inputs (e.g. d, enable pins) to the flops. The existing gating condition of the flop may additionally be ORed with the accelerated condition to produce the condition of a d-pin.

In another embodiment, feedback nets within the netlist may be assigned a condition of "0." In this way, the netlist may be rendered acyclic for the purpose of condition propagation if there are sequential cycles present, as described in more detail below with respect to FIG. 3. In yet another embodiment, with respect to the end of the post-order depth first search algorithm, nets within the netlist may be assigned a condition.

Figure 3:
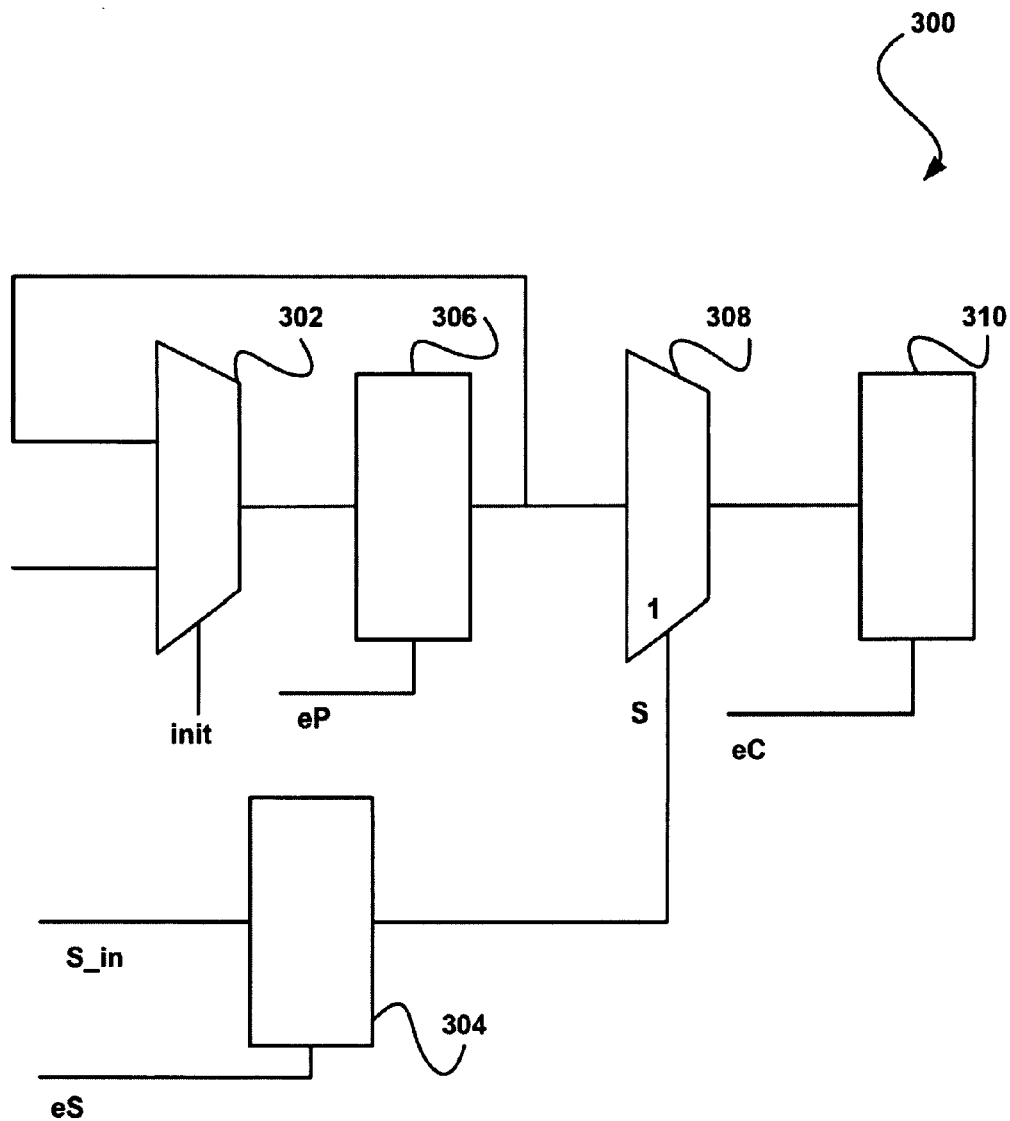
FIG. 3 shows a system with a sequential cycle for identifying a condition where an output of a logic element is not a function of a first input of the logic element, due to a second input of the logic element, in accordance with still yet another embodiment.

FIG. 3 shows a system 300 with a sequential cycle for identifying a condition where an output of a logic element is not a function of a first input of the logic element, due to a second input of the logic element, in accordance with still yet another embodiment. As an option, the system 300 may be implemented in the context of the details of FIGS. 1 and/or 2. Of course, however, the system 300 may be implemented in any desired environment. Further, the aforementioned definitions may equally apply to the description below.

The condition (e.g. observability based clock gating condition) expression may be computed along multiple fanouts, such that only common condition expressions (e.g. identified utilizing an AND operation, etc.) along the branches may be further propagated. Since conditions of feedback nets may be set to "0," the condition expression across a sequential loop may become null.

For example, if eP (the input of the producer flip flop 306) is gated with S (the output of the selector flip flop 304) using condition propagation, and the feedback path is ignored, then not only will eP(T) be gated using S(T), but also eP(T+1), eP(T+2) etc., which would not necessarily be functionally correct. In one embodiment, however, a condition generated within a simple sequential cycle may be propagated further into the cycle, when the simple sequential cycle can be removed by adding an enabling condition to the flip flop such that relaxed implication holds in its general or more specific forms.

As another option, deeper propagation of gating conditions may be provided by factoring out conditions incapable of being accelerated. via universal quantification. For example, in some situations, an identified condition expression may have terms that are incapable of being accelerated. Discarding the entire condition expression when some terms are incapable of being accelerated may be wasteful (e.g. because of the possible elimination of useful conditions).

In one embodiment, for a condition expression f, let Xna be a signal in the condition expression that is incapable of being accelerated. A function may be identified that is independent of Xna, and that implies f. Thus, f may be written as f=f(Xna=1).Xna+f(Xna=0).Xna'.

Utilizing a venn diagram showing all possible interrelationships between f and Xna, the function may have three regions, a first region where f is true only if f(Xna=1), a second region where f is true only if f(Xna=0), and a third region in the middle where (for both Xna=1 and Xna=0) f is true. The third region may thus allow f to be true irrespective of Xna.

Furthermore, the third region may be represented by f(Xna=0) & f(Xna=1), which accordingly is a function independent of Xna. Such identification of a function independent of Xna may be repeated for each input incapable of being accelerated.

Figure 4:
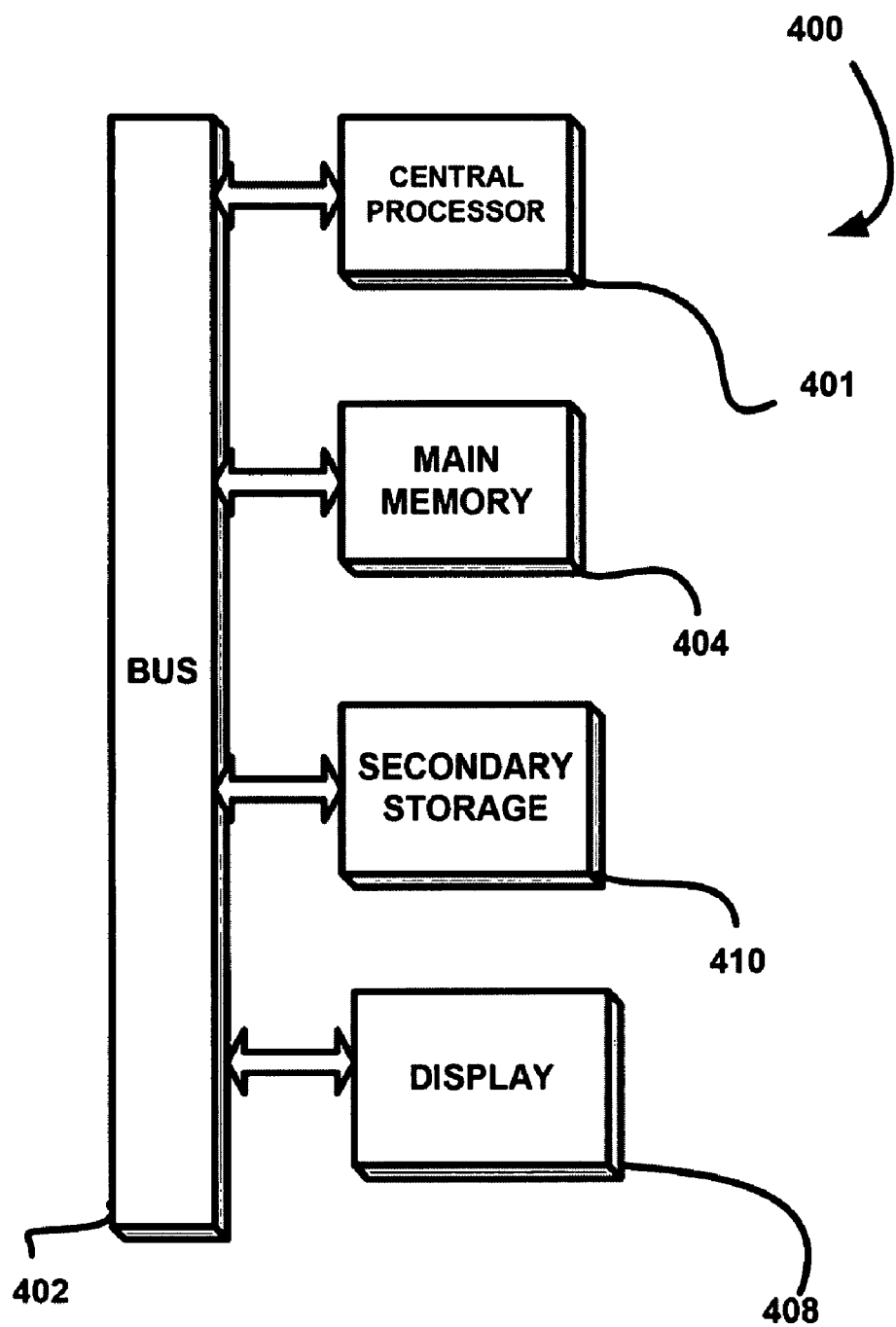
FIG. 4 illustrates an exemplary system, in accordance with one embodiment.

FIG. 4 illustrates an exemplary system 400 with which the various features of the previous may be implemented, in accordance with one embodiment. Of course, the system 400 may be implemented in any desired environment.

As shown, a system 400 is provided including at least one central processor 201 which is connected to a communication bus 402. The system 400 also includes main memory 404 [e.g. random access memory (RAM), etc.]. The system 400 also includes a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 204, storage 210 and/or any other storage are possible examples of computer-readable media.

In one embodiment, such computer programs may be used to carry out the functionality of the previous figures. Further, in other embodiments, the architecture and/or functionality of the various previous figures may be implemented using the host processor 401, a chipset (i.e. a group of integrated circuits designed to work and sold as a unit for performing related functions, etc.), and/or any other integrated circuit for that matter.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying at least one condition where an output of a first logic element is not a function of a first input of the first logic element, due to a second input of the first logic element, by a processor; and
disabling at least one second logic element based on the identified condition, utilizing an integrated circuit;
wherein the at least one condition includes an observability based clock gating condition, the observability based clock gating condition including the first input of the first logic element not being observable at the output of the first logic element based on the first input of the first logic element not being allowed to pass through the first logic element;
wherein the at least one condition includes a state where the output of the first logic element is not a function of the first input of the first logic element during a first clock cycle and a number of subsequent clock cycles, due to the second input of the first logic element during the first clock cycle and the same number of subsequent clock cycles, and the at least one second logic element is disabled during at least the first clock cycle.

2. The method of claim 1, wherein the first logic element includes at least one of a flip flop, a multiplexer, an AND gate, and an OR gate.

3. The method of claim 1, wherein the at least one second logic element is included within a transitive fanin of the first logic element.

4. The method of claim 1, wherein the output of the first logic element is not a function of the first input of the first logic element, due to a plurality of second inputs of the first logic element.

5. The method of claim 1, wherein a plurality of conditions are propagated from a plurality of outputs to a plurality of inputs.

6. The method of claim 5, wherein the plurality of the conditions are propagated from the plurality of the outputs to the plurality of the inputs, utilizing a depth first search algorithm.

7. The method of claim 1, wherein the at least one condition is one where the output of the first logic element is not a function of the first input of the first logic element during the first clock cycle and the number of subsequent clock cycles, due to the second input of the first logic element during the first clock cycle and the same number of subsequent clock cycles, and the at least one second logic element is disabled during cycles previous to the first clock cycle.

8. The method of claim 1, wherein the first logic element includes a flip flop that includes an enable pin.

9. A method, comprising:
    identifying at least one condition where an output of a first logic element is not a function of a first input of the first logic element, due to a second input of the first logic element, by a processor; and
    disabling at least one second logic element based on the identified condition, utilizing an integrated circuit;
    wherein the at least one condition includes an observability based clock gating condition, the observability based clock gating condition including the first input of the first logic element not being observable at the output of the first logic element based on the first input of the first logic element not being allowed to pass through the first logic element;
    wherein the output of the first logic element is a function of the first input of the first logic element if the second input of the first logic element is in a first state, and the output of the first logic element is not a function of the first input of the first logic element if the second input of the first logic element is in a second state;
    wherein the at least one second logic element is disabled during a first clock cycle when the second input of the first logic element is in the second state during subsequent clock cycles.

10. A computer program product embodied on a non-transitory computer readable medium, comprising:
    computer code for identifying at least one condition where an output of a first logic element is not a function of a first input of the first logic element, due to a second input of the first logic element; and
    computer code for disabling at least one second logic element based on the identified condition;
    wherein the at least one condition includes an observability based clock gating condition, the observability based clock gating condition including the first input of the first logic element not being observable at the output of the first logic element based on the first input of the first logic element not being allowed to pass through the first logic element;
    wherein the at least one condition includes a state where the output of the first logic element is not a function of the first input of the first logic element during a first clock cycle and a number of subsequent clock cycles, due to the second input of the first logic element during the first clock cycle and the same number of subsequent clock cycles, and the at least one second logic element is disabled during at least the first clock cycle.

11. The computer program product of claim 10, wherein the first or second logic element includes at least one of a flip flop, a multiplexer, an AND gate, and an OR gate.

12. The computer program product of claim 10, wherein the at least one condition is one where the output of the first logic element is not a function of the first input of the first logic element during a first clock cycle and a number of subsequent clock cycles, due to the second input of the first logic element during the first clock cycle and the same number of subsequent clock cycles, and the at least one second logic element is disabled during at least the first clock cycle.

13. The computer program product of claim 10, wherein the at least one second logic element is included within a transitive fanin of the first logic element.

14. The computer program product of claim 10, wherein the output of the first logic element is a function of the first input of the first logic element if the second input of the first logic element is in a first state, and the output of the first logic element is not a function of the first input of the first logic element if the second input of the first logic element is in a second state.

15. The computer program product of claim 14, wherein the at least one second logic element is disabled during a first clock cycle when the second input of the first logic element is in the second state during subsequent clock cycles.

16. The computer program product of claim 10, wherein the output of the first logic element is not a function of the first input of the first logic element, due to a plurality of the second inputs of the first logic element.

17. The computer program product of claim 10, wherein a plurality of conditions are propagated from a plurality of outputs to a plurality of inputs.

18. A system, comprising:
    means for identifying at least one condition where an output of a first logic element is not a function of a first input of the first logic element, due to a second input of the first logic element; and
    means for disabling at least one second logic element based on the identified condition;
    wherein the at least one condition includes an observability based clock gating condition, the observability based clock gating condition including the first input of the first logic element not being observable at the output of the first logic element based on the first input of the first logic element not being allowed to pass through the first logic element;
    wherein the at least one condition includes a state where the output of the first logic element is not a function of the first input of the first logic element during a first clock cycle and a number of subsequent clock cycles, due to the second input of the first logic element during the first clock cycle and the same number of subsequent clock cycles, and the at least one second logic element is disabled during at least the first clock cycle.

* * * * *